US012531907B2

(12) United States Patent
Qian

(10) Patent No.: US 12,531,907 B2
(45) Date of Patent: Jan. 20, 2026

(54) SOFTWARE-DEFINED WIDE AREA NETWORK SELF-SERVICE FOR SERVICE ASSURANCE

(71) Applicant: AT&T Intellectual Property I, L.P., Atlanta, GA (US)

(72) Inventor: Zhiqiang Qian, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 374 days.

(21) Appl. No.: 17/984,348

(22) Filed: Nov. 10, 2022

(65) Prior Publication Data

US 2024/0163313 A1 May 16, 2024

(51) Int. Cl.
*H04L 9/40* (2022.01)
*H04L 12/46* (2006.01)

(52) U.S. Cl.
CPC .......... *H04L 63/20* (2013.01); *H04L 12/4641* (2013.01)

(58) Field of Classification Search
CPC .. H04L 63/20; H04L 12/4641; H04L 12/4633
See application file for complete search history.

(56) References Cited

U.S. PATENT DOCUMENTS

| | | | |
|---|---|---|---|
| 6,668,282 B1 * | 12/2003 | Booth, III | H04L 41/0681 709/227 |
| 6,976,071 B1 * | 12/2005 | Donzis | H04L 63/164 709/227 |
| 7,401,354 B2 * | 7/2008 | Boden | H04L 63/0272 713/150 |
| 10,205,705 B2 * | 2/2019 | Bakthavathsalu | H04L 63/0272 |
| 10,708,082 B1 * | 7/2020 | Bakiaraj | H04L 41/0895 |
| 10,764,313 B1 * | 9/2020 | Mushtaq | G06N 20/00 |
| 10,887,818 B1 * | 1/2021 | Maria | H04L 45/56 |
| 11,018,899 B1 * | 5/2021 | Melkild | G06F 8/60 |
| 11,063,842 B1 * | 7/2021 | Vasseur | G06N 5/01 |
| 11,095,612 B1 * | 8/2021 | Oswal | H04L 63/1416 |
| 11,316,822 B1 * | 4/2022 | Gawade | G06F 11/2025 |

(Continued)

*Primary Examiner* — Aravind K Moorthy
(74) *Attorney, Agent, or Firm* — Hartman & Citrin LLC

(57) ABSTRACT

The concepts and technologies disclosed herein are directed to software-defined wide-area network ("SD-WAN") self-service for service assurance. The proposed SD-WAN self-service solution can be used for any policy-driven system that automatically troubleshoots the problems resulting from hybrid SD-WAN network activities, including virtual private network ("VPN"), IP tunnel, IPSec, and security policies. According to one aspect disclosed herein, a method can check network configurations, analyze switch responses, and locate network problems quickly. Moreover, the method can test the functionality of a rules-based troubleshooting software effectively without employing expensive testing equipment and with minimal human intervention. Without the disclosed solution, telecommunications service providers may have to hire more software engineers who understand SDN and cloud technologies to effectively troubleshoot SD-WAN network connectivity issues, including issues caused by virtual network function ("VNF"), virtual machine ("VM"), and SDN switches. Thus, this labor-intensive solution is not only expensive, but also not immune to human error.

20 Claims, 6 Drawing Sheets

(56) References Cited

U.S. PATENT DOCUMENTS

| | | | |
|---|---|---|---|
| 11,323,312 B1* | 5/2022 | Banka | H04L 41/0677 |
| 11,323,330 B1* | 5/2022 | Chang | H04L 41/14 |
| 11,336,563 B1* | 5/2022 | Kurmala | H04L 61/5061 |
| 11,343,171 B2* | 5/2022 | Vasseur | H04L 45/302 |
| 11,381,474 B1* | 7/2022 | Kumar | H04L 41/0897 |
| 11,469,958 B1* | 10/2022 | Mackie | H04L 41/0893 |
| 11,496,519 B1* | 11/2022 | Gupta | H04L 9/0891 |
| 11,502,895 B1* | 11/2022 | Van Oort | H04L 12/4633 |
| 11,546,291 B1* | 1/2023 | Yu | H04L 61/3025 |
| 11,563,601 B1* | 1/2023 | K S | H04L 41/0816 |
| 11,601,344 B1* | 3/2023 | Kanevsky | H04L 43/0817 |
| 11,606,273 B1* | 3/2023 | Kumar | H04L 43/087 |
| 11,637,753 B1* | 4/2023 | Wang | H04L 41/0893 709/223 |
| 11,700,236 B2* | 7/2023 | Miriyala | G06F 21/53 726/1 |
| 11,700,274 B1* | 7/2023 | Kravtsov | H04L 63/205 726/25 |
| 11,729,187 B2* | 8/2023 | Diaz-Cuellar | H04L 63/0272 713/154 |
| 11,765,050 B1* | 9/2023 | Nainar | H04L 41/5009 709/223 |
| 11,805,048 B1* | 10/2023 | Means | H04L 45/124 |
| 11,863,432 B1* | 1/2024 | Garcarz | H04L 67/10 |
| 2006/0190720 A1* | 8/2006 | Ozaki | H04L 63/0428 713/160 |
| 2007/0022469 A1* | 1/2007 | Cooper | H04L 9/3247 726/3 |
| 2008/0052508 A1* | 2/2008 | Huotari | H04L 63/0272 713/153 |
| 2008/0080507 A1* | 4/2008 | Swallow | H04L 12/4633 370/392 |
| 2010/0058082 A1* | 3/2010 | Locker | G06F 1/3209 713/320 |
| 2011/0013520 A1* | 1/2011 | Dunn | H04L 41/0659 370/242 |
| 2011/0161653 A1* | 6/2011 | Keohane | H04L 63/0428 718/1 |
| 2012/0078998 A1* | 3/2012 | Son | H04L 61/4511 709/203 |
| 2013/0128731 A1* | 5/2013 | Bandlamudi | H04L 47/19 370/230 |
| 2014/0068750 A1* | 3/2014 | Tjahjono | H04L 63/029 726/15 |
| 2017/0026417 A1* | 1/2017 | Ermagan | H04L 63/0428 |
| 2017/0149743 A1* | 5/2017 | Fukuda | H04L 63/0428 |
| 2017/0346722 A1* | 11/2017 | Smith | H04L 1/008 |
| 2018/0063743 A1* | 3/2018 | Tumuluru | H04W 28/0273 |
| 2018/0091481 A1* | 3/2018 | Mehta | H04L 63/06 |
| 2018/0123950 A1* | 5/2018 | Garg | H04L 45/22 |
| 2019/0058656 A1* | 2/2019 | Gundersen | H04L 41/22 |
| 2019/0182213 A1* | 6/2019 | Saavedra | H04L 63/0218 |
| 2019/0245811 A1* | 8/2019 | Sergeev | H04L 63/02 |
| 2019/0342315 A1* | 11/2019 | Smelov | H04L 43/06 |
| 2020/0073692 A1* | 3/2020 | Rao | H04L 45/586 |
| 2020/0106687 A1* | 4/2020 | Nambisan | H04L 12/2854 |
| 2020/0106746 A1* | 4/2020 | Park | H04L 61/4511 |
| 2020/0177606 A1* | 6/2020 | Valluri | H04L 63/0272 |
| 2020/0195557 A1* | 6/2020 | Duan | H04L 45/033 |
| 2020/0295984 A1* | 9/2020 | Qian | H04L 41/0853 |
| 2020/0296026 A1* | 9/2020 | Michael | H04L 45/12 |
| 2020/0322283 A1* | 10/2020 | Osterlund | H04L 45/22 |
| 2021/0126860 A1* | 4/2021 | Ramaswamy | H04L 45/50 |
| 2021/0184958 A1* | 6/2021 | Kolar | H04L 41/16 |
| 2021/0185013 A1* | 6/2021 | Zhang | H04L 61/5014 |
| 2021/0203698 A1* | 7/2021 | Pan | H04L 41/0895 |
| 2021/0211347 A1* | 7/2021 | Vasseur | H04L 43/0876 |
| 2021/0218712 A1* | 7/2021 | Zhao | H04L 63/0884 |
| 2021/0234898 A1* | 7/2021 | Desai | H04L 63/104 |
| 2021/0235325 A1* | 7/2021 | Desai | H04W 88/14 |
| 2021/0294818 A1* | 9/2021 | Savalle | G06F 16/906 |
| 2021/0304026 A1* | 9/2021 | Mermoud | G06F 18/214 |
| 2021/0304061 A1* | 9/2021 | Kolar | G06F 11/3447 |
| 2021/0385907 A1* | 12/2021 | Kobayashi | H04W 88/06 |
| 2021/0392171 A1* | 12/2021 | Srinivas | G06N 5/047 |
| 2022/0006726 A1* | 1/2022 | Michael | H04L 45/745 |
| 2022/0052949 A1* | 2/2022 | Shen | H04L 43/16 |
| 2022/0060408 A1* | 2/2022 | Manickam | H04L 45/64 |
| 2022/0070146 A1* | 3/2022 | Gerstel | H04L 12/2854 |
| 2022/0070717 A1* | 3/2022 | Lutz | H04L 43/0876 |
| 2022/0103398 A1* | 3/2022 | Hu | H04L 12/4633 |
| 2022/0103597 A1* | 3/2022 | Gobena | H04L 63/205 |
| 2022/0116273 A1* | 4/2022 | Cunningham | H04L 41/0823 |
| 2022/0116381 A1* | 4/2022 | Bosch | H04L 63/105 |
| 2022/0116484 A1* | 4/2022 | Cunningham | H04L 67/141 |
| 2022/0141192 A1* | 5/2022 | Silveira | H04L 63/0823 726/15 |
| 2022/0141239 A1* | 5/2022 | Zaman | G06F 21/71 726/23 |
| 2022/0141254 A1* | 5/2022 | Oswal | H04L 63/101 726/1 |
| 2022/0158924 A1* | 5/2022 | Ramaswamy | H04L 43/10 |
| 2022/0166755 A1* | 5/2022 | Moore | H04L 63/0245 |
| 2022/0173958 A1* | 6/2022 | Triplet | G06N 5/025 |
| 2022/0191647 A1* | 6/2022 | Zohoorian | H04W 4/029 |
| 2022/0209990 A1* | 6/2022 | Dillon | H04L 12/2869 |
| 2022/0210038 A1* | 6/2022 | Pueblas | H04L 43/20 |
| 2022/0210113 A1* | 6/2022 | Pillareddy | H04L 45/745 |
| 2022/0231949 A1* | 7/2022 | Ramaswamy | H04L 45/24 |
| 2022/0255810 A1* | 8/2022 | Tomkins | H04L 43/16 |
| 2022/0272614 A1* | 8/2022 | Lu | H04W 48/16 |
| 2022/0286391 A1* | 9/2022 | Agarwal | H04L 45/306 |
| 2022/0294686 A1* | 9/2022 | Triplet | H04W 12/06 |
| 2022/0329477 A1* | 10/2022 | Chiganmi | H04L 41/0654 |
| 2022/0334864 A1* | 10/2022 | K N | G06F 8/61 |
| 2022/0360500 A1* | 11/2022 | Ramaswamy | H04L 41/122 |
| 2022/0386400 A1* | 12/2022 | Posthuma | H04W 40/36 |
| 2023/0011452 A1* | 1/2023 | Barber | G06F 16/24558 |
| 2023/0025898 A1* | 1/2023 | Kaplan | H04W 12/086 |
| 2023/0027754 A1* | 1/2023 | Kolar | H04L 41/0631 |
| 2023/0031921 A1* | 2/2023 | Devendran | H04L 45/22 |
| 2023/0081708 A1* | 3/2023 | Szigeti | H04L 63/029 726/1 |
| 2023/0091734 A1* | 3/2023 | Reddy | H04L 43/0841 370/252 |
| 2023/0097517 A1* | 3/2023 | Heranjal | H04L 45/38 709/238 |
| 2023/0105680 A1* | 4/2023 | Simlai | H04L 47/2441 370/392 |
| 2023/0118718 A1* | 4/2023 | Solanki | H04L 12/4633 726/12 |
| 2023/0188492 A1* | 6/2023 | Shen | H04L 45/748 709/245 |
| 2023/0188987 A1* | 6/2023 | Qumruzzaman | H04W 76/19 370/252 |
| 2023/0208769 A1* | 6/2023 | Iyer | H04L 45/64 370/230 |
| 2023/0231845 A1* | 7/2023 | Manoharan | H04L 63/08 726/3 |
| 2023/0239234 A1* | 7/2023 | Zohar | H04L 45/123 370/389 |
| 2023/0254243 A1* | 8/2023 | Vysotsky | H04L 67/141 370/389 |
| 2023/0261859 A1* | 8/2023 | Bryden | H04L 9/3215 713/168 |
| 2023/0262525 A1* | 8/2023 | Pularikkal | H04L 41/40 370/235 |
| 2023/0291735 A1* | 9/2023 | Cheethirala | H04L 63/0876 |
| 2023/0300560 A1* | 9/2023 | Chandrasekaran | H04B 17/364 370/329 |
| 2023/0308470 A1* | 9/2023 | Kulshreshtha | H04L 63/1441 |
| 2023/0319113 A1* | 10/2023 | Kaimal | H04L 63/101 726/1 |
| 2023/0327994 A1* | 10/2023 | Sundararajan | H04L 45/34 370/235 |
| 2023/0344707 A1* | 10/2023 | Sowatskey | H04L 47/82 |
| 2023/0344764 A1* | 10/2023 | Kassahun | H04L 43/0811 |
| 2023/0344770 A1* | 10/2023 | Kadam | H04L 63/029 |
| 2023/0353421 A1* | 11/2023 | Hatte | H04L 12/4633 |
| 2023/0376879 A1* | 11/2023 | Nainar | H04L 67/141 |
| 2023/0379365 A1* | 11/2023 | Szigeti | H04L 63/1425 |

(56) References Cited

U.S. PATENT DOCUMENTS

| | | | | |
|---|---|---|---|---|
| 2023/0388233 | A1* | 11/2023 | Thoria | H04L 45/04 |
| 2023/0396538 | A1* | 12/2023 | Kotrabasappa | H04L 45/42 |
| 2023/0396670 | A1* | 12/2023 | Kotrabasappa | H04L 45/121 |
| 2023/0421538 | A1* | 12/2023 | Ponaka | H04L 63/0236 |
| 2024/0015087 | A1* | 1/2024 | Mermoud | G06N 5/01 |
| 2024/0015110 | A1* | 1/2024 | Cao | H04L 47/826 |
| 2024/0020107 | A1* | 1/2024 | Beveridge | G06F 8/65 |
| 2024/0022548 | A1* | 1/2024 | Sajassi | H04L 63/164 |
| 2024/0031264 | A1* | 1/2024 | Nigam | H04L 43/16 |
| 2024/0031810 | A1* | 1/2024 | Polaganga | H04W 48/02 |
| 2024/0039743 | A1* | 2/2024 | Pillai | H04L 12/12 |
| 2024/0039804 | A1* | 2/2024 | Aygar | H04L 63/04 |
| 2024/0048492 | A1* | 2/2024 | Mariappan | H04L 61/5007 |
| 2024/0064079 | A1* | 2/2024 | Kolar | H04L 41/0631 |
| 2024/0080744 | A1* | 3/2024 | Hotchkiss | H04L 41/22 |
| 2024/0106867 | A1* | 3/2024 | Shaik | H04L 41/0816 |
| 2024/0113939 | A1* | 4/2024 | May | H04L 12/12 |
| 2024/0113967 | A1* | 4/2024 | Shoemaker | H04L 63/1408 |
| 2024/0114000 | A1* | 4/2024 | Wen | H04L 63/0227 |
| 2024/0114425 | A1* | 4/2024 | Wei | H04W 40/30 |
| 2024/0134729 | A1* | 4/2024 | Suryakant Devangan | G06F 11/0763 |
| 2024/0137311 | A1* | 4/2024 | Jain | H04L 45/30 |
| 2024/0146727 | A1* | 5/2024 | Jeuk | H04L 63/105 |
| 2024/0179089 | A1* | 5/2024 | Cirkovic | H04L 45/748 |

* cited by examiner

SOFTWARE-DEFINED WIDE AREA NETWORK SELF-SERVICE FOR SERVICE ASSURANCE

BACKGROUND

Software-defined wide area networks ("SD-WANs") provide robust network connectivity and cost-saving benefits for companies to fulfill their telecommunications service needs. SD-WAN alone, however, is not as reliable as traditional multi-protocol label switching ("MPLS"). As a result, some telecommunications service providers now offer hybrid SD-WAN solutions that integrate benchmark features of MPLS-based virtual private networks ("VPNs") and the robust nature of SD-WAN. This hybrid solution inevitably increases network complexity. Network operations personnel must be equipped to handle SD-WAN problems caused by VPN, IP tunnel, and IPSec, as well as security policies. Therefore, automating SD-WAN fault management is critical for telecommunications service providers to deploy hybrid SD-WAN service offerings.

SUMMARY

Concepts and technologies disclosed herein are directed to SD-WAN self-service for service assurance. According to one aspect of the concepts and technologies disclosed herein, an SD-WAN self-service automation platform can monitor an SD-WAN network for a network alarm. The SD-WAN self-service automation platform can create a service chain for the SD-WAN network. The SD-WAN self-service automation platform can determine whether a network alarm was found. In response to determining that a network alarm was found, the SD-WAN self-service automation platform can confirm the network alarm and correlate the network alarm with a support ticket. In response to determining that no network alarms were found, the SD-WAN self-service automation platform can collect a network response from an IP tunnel in the SD-WAN network. The SD-WAN self-service automation platform can verify any SD-WAN diagnoses on a VPN connection supported by the SD-WAN via the IP tunnel. The SD-WAN self-service automation platform can determine whether a VPN problem was found. In response to determining that a VPN problem was found, the SD-WAN self-service automation platform can verify layer 1, layer 2, and layer 3 testing of the SD-WAN. In response to determining that no VPN problems were found, the SD-WAN self-service automation platform can determine whether the IP tunnel is active. In response to determining that the IP tunnel is inactive, the SD-WAN self-service automation platform can verify a configuration of the IP tunnel and reset the IP tunnel. In response to determining that the IP tunnel is active, the SD-WAN self-service automation platform can determine whether an IPSec connection is active. In response to determining that the IPSec connection is inactive, the SD-WAN self-service automation platform can confirm a configuration of the IPSec connection and can recreate the IPSec connection. In response to determining that the IPSec connection is active, the SD-WAN self-service automation platform can determine whether a security policy configuration for the IPSec connection is functioning correctly. In response to determining that the security policy configuration for the IPSec connection is not functioning correctly, the SD-WAN self-service automation platform can confirm the security policy configuration and can recreate the IPSec connection. In response to determining that the security policy configuration for the IPSec connection is functioning correctly, the SD-WAN self-service automation platform can determine whether an IP protocol status for the IPSec connection is functioning correctly. In response to determining that the IP protocol status for the IPSec connection is not functioning correctly, the SD-WAN self-service automation platform can confirm an IP protocol configuration and can re-establish the IPSec connection. In response to determining that the IP protocol status for the IPSec connection is functioning correctly, the SD-WAN self-service automation platform can verify a ping test to a customer site and can send simulated IP traffic over an SD-WAN service path. The SD-WAN self-service automation platform can determine whether the ping test was successful and whether the SD-WAN service path is active. In response to determining that the ping test was successful and the SD-WAN service path is active, the SD-WAN self-service automation platform can confirm that network tests are functioning correctly and that service is to be restored. In response to determining that the ping test was unsuccessful or that the SD-WAN service path is inactive, the SD-WAN self-service automation platform can confirm a possible network failure.

In some embodiments, the SD-WAN self-service automation platform can provide a self-service portal through which an SD-WAN self-service feature can be activated. The SD-WAN self-service feature can be provided to a customer associated with a customer site that utilizes, at least in part, the SD-WAN (e.g., to access dedicated Internet, VPN, or private cloud services).

In some embodiments, the SD-WAN self-service automation platform can analyze a response from an external system via an application programming interface. The external system can include a ticketing system, an inventory system, a testing system, or an alarm monitoring system. In some embodiments, the SD-WAN self-service automation platform can analyze a response associated with layer 1 traffic, layer 2 traffic, or layer 3 traffic.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

The concepts and technologies disclosed herein are directed to SD-WAN self-service for service assurance. The proposed SD-WAN self-service solution can be used for any policy-driven expert system that automatically troubleshoots the problems resulting from hybrid SD-WAN network activities, including VPN, IP tunnel, IPSec, and security policies. According to one aspect disclosed herein, a method can check network configurations, analyze switch responses, and locate network problems quickly. Moreover, the method can test the functionality of a rules-based troubleshooting software effectively without employing expensive testing equipment and with minimal human intervention. Without the disclosed solution, telecommunications service providers may have to hire more software engineers who understand SDN and cloud technologies to effectively troubleshoot SD-WAN network connectivity issues, including issues caused by VNF, VM, and SDN switches. Thus, this labor-intensive solution is not only expensive, but also not immune to human error.

Figure 1:
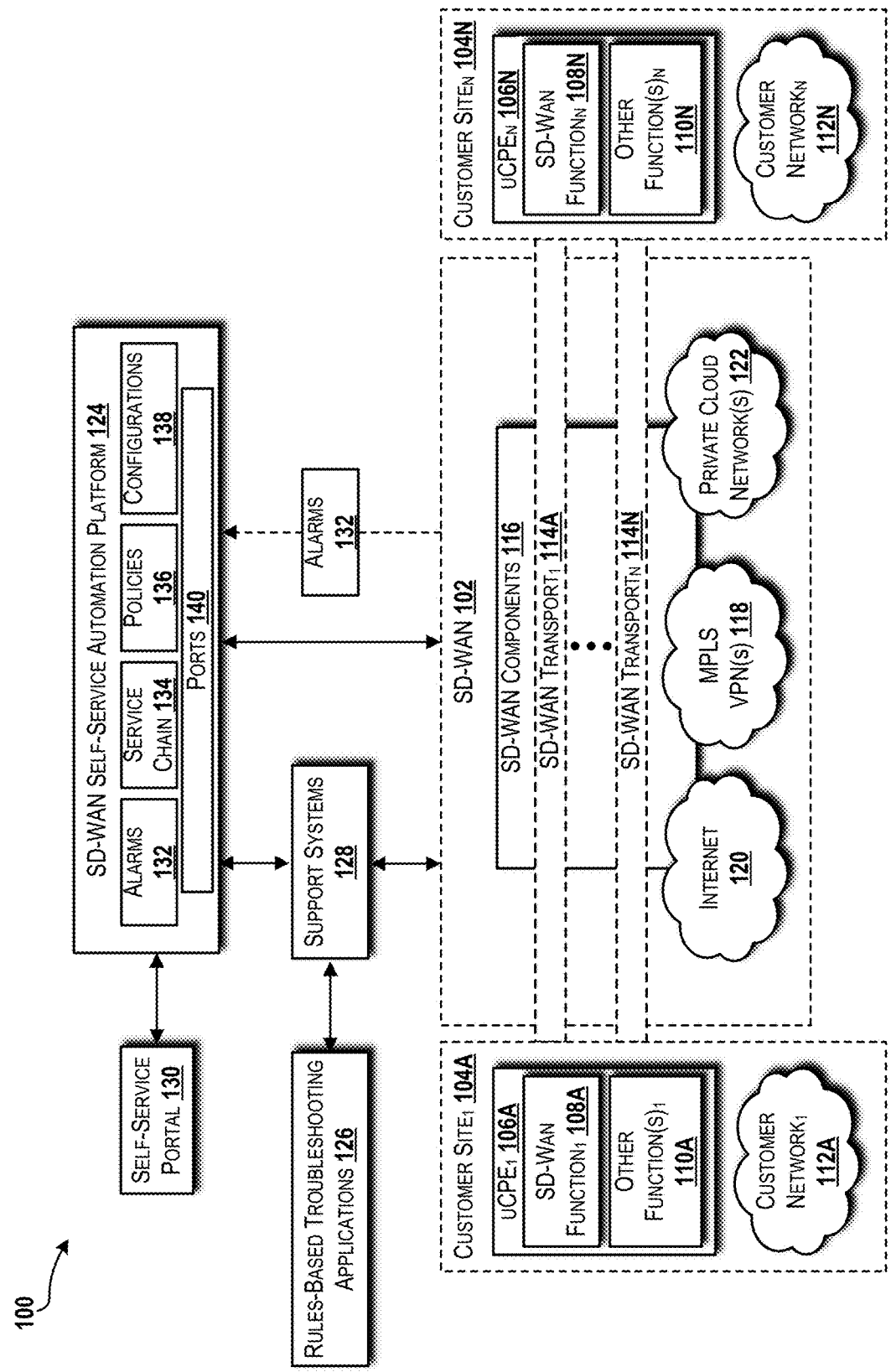
FIG. 1 is a block diagram illustrating aspects of an illustrative operating environment for various concepts and technologies disclosed herein.

Turning now to FIG. 1, an operating environment 100 for implementing embodiments of the concepts and technologies disclosed herein will be described. The operating environment 100 includes an SD-WAN 102 that can connect multiple customer sites 104A-104N, such as, but not limited to, data centers, branch sites, and public cloud services, operating at the edge of the SD-WAN 102. In the illustrated example, the customer site$_1$ 104A includes a universal customer premises equipment$_1$ ("uCPE$_1$") 106A that can host various virtual network functions ("VNFs"), such as an SD-WAN function$_1$ 108A and one or more other functions' 110A (e.g., switches, routers, gateways, firewalls, deep packet inspection, and/or the like) operating as part of a customer network$_1$ 112A. Similarly, the customer site$_N$ 104N includes a CPE$_N$ ("uCPE$_N$") 106N that can host various virtual network functions, such as an SD-WAN function 108N and one or more other functions$_N$ 110N (e.g., switches, routers, firewalls, deep packet inspection, and/or the like) operating as part of a customer networker 112N. The SD-WAN functions 108A-108N enable the uCPEs 106A-106N, respectively, to connect to the SD-WAN 102, which can utilize various SD-WAN components 116 to establish and manage SD-WAN transports 114A-114N that facilitate data transport across the SD-WAN 102 (e.g., between the customer sites 104A, 104N). The SD-WAN transports 114A-114N can utilize IP tunneling and/or IP security ("IPSec") tunneling to provide connectivity for one or more MPLS VPN 118, the Internet 120, and/or one or more private cloud networks 122. The SD-WAN components 116 can include various VNFs and/or hybrid network functions, such as routers, gateways, switches, firewalls, and the like. In addition, the SD-WAN components 116 can include one or more SD-WAN controllers and one or more SD-WAN orchestrators. Briefly, the SD-WAN orchestrator(s) can manage the SD-WAN 102 by overseeing traffic that traverses the SD-WAN 102 and can apply policy and protocol established by the network operator. The SD-WAN controller(s) can provide centralized management and enables network operators to view the entirety of the SD-WAN 102 and set policy to be applied by the SD-WAN orchestrator(s). Those skilled in the art will appreciate that the illustrated SD-WAN 102 is a simplified example of an SD-WAN deployment. Due to the unique requirements of the customers at the customer sites 104, the SD-WAN 102 may be configured in numerous ways using various SD-WAN components 116 to provide connectivity to the MPLS VPN(s) 118, the Internet 120, the private cloud networks(s) 122, and/or other networks (not shown), in any combination. As such, the illustrated example should not be construed as being limiting in any way.

According to embodiments, an SD-WAN self-service automation platform 124 can automatically troubleshoot problems resulting from SD-WAN network activities, such as VPN, IP tunnel, IPSec, and the implementation of security policies. The SD-WAN self-service automation platform 124 can check network configurations, analyze switch responses, and locate network problems quickly. Moreover, the SD-WAN self-service automation platform 124 can test the functionality of rules-based troubleshooting applications 126 without employing expensive testing equipment in network clouds and with minimal human intervention. The SD-WAN self-service automation platform 124 can provide a policy-driven and application programming interface ("API")-powered software tool that utilizes modern programming language (e.g., XML, Java, and Python) to collect responses from the rules-based troubleshooting applications 126 used by fault management systems, performance monitoring systems, live inventory systems, and testing systems (shown collectively as "support systems 128"). The SD-WAN self-service automation platform 124 can present real-time SD-WAN network performance data via a self-service portal 130. The self-service portal 130 can provide access to all desired network performance responses that are either specific to a particular API invocation or to a particular service such as the SD-WAN service.

The SD-WAN self-service automation platform 124 can provide the following high-level automation steps for SD-WAN self-service automation. A more detailed methodology for implementing these steps is illustrated and described herein with reference to FIG. 2. The SD-WAN self-service automation platform 124 can monitor alarms 132 from the SD-WAN components 116 (e.g., AT&T FlexWare, vHNF, vHNGW, IP Tunnel, VPN PE, dedicated Internet PE, combinations thereof, and/or the like). The SD-WAN self-service automation platform 124 can create a service chain 134 of the SD-WAN transport 114 types and the SD-WAN components 116 based on real-time data. The SD-WAN self-service automation platform 124 can verify alarm correlation for any network outage and ticket correlation for service trouble tickets to network outage tickets. The SD-WAN self-service automation platform 124 can execute SHOW commands to verify IP interface testing on the ports of the SD-WAN components 116 when no alarm 132 is found. The SD-WAN self-service automation platform 124 can examine tunnel interface responses to verify IP tunnel connectivity when the MPLS VPN 118 is active and connected device(s) is/are free of trouble. The SD-WAN self-service automation platform 124 can check IP security responses to verify IPSec connection when an IPSec tunnel is active. The SD-WAN self-service automation platform 124 can examine policy responses to verify security policies 136 and security configurations 138 including security association, encapsulation security payload, and security authentication header. The SD-WAN self-service automation platform 124 can verify IP routing protocol responses to check Open Shortest Path First ("OSPF") and Enhanced Interior Gateway Routing Protocol (EIGRP) when no security issues exist. The SD-WAN self-service automation platform 124 can verify ticket activities, including auto-closure, auto-referral, and auto-notification based on a diagnosed result when a root cause is found. The SD-WAN self-service automation platform 124 can simulate service path traffic to verify customer service connectivity when a problem is fixed or when no problem is found.

The disclosed method can analyze the desired network performance response from external applications, such as the rules-based troubleshooting applications 126, by utilizing various APIs. The APIs can be capable of connecting to live testing equipment (not shown; may be part of the support systems 128) or the SD-WAN 102. The following example demonstrates how various ports 140 of the SD-WAN self-service automation platform 124 can connect to various support systems 128 and applications provided via the SD-WAN 102. Some of the support systems 128 are particular to AT&T, but other network operators may have similar systems.

API 1001: This port gets responses from ticketing systems including AT&T One Ticketing System ("AOTS") and Business Maintenance Platform ("BMP").

API 1002: This port gets responses from inventory systems including Enterprise Data Fabric ("EDF") and active and available inventory ("A&AI").

API 1003: This port gets responses from testing systems including Common Test Platform ("CTP") and Authentication and Access Control Gateway ("AACG").

API 1004: This port gets responses from alarm monitoring systems including Data Collection, Analytics and Events ("DCAE") and Global Fault Platform ("GFP").

API 1005: This port gets responses from ticket notification systems including C-BUS.

API 1006: This port gets responses from L3 network traffic including VPN and IP.

API 1007: This port gets responses from L2 network traffic including Ethernet and Ethernet Virtual Connections ("EVC").

API 1008: This port gets responses from L1 network traffic including Synchronous Optical Networking ("SONET") and Synchronous Digital Hierarchy ("SDH").

Figure 2:
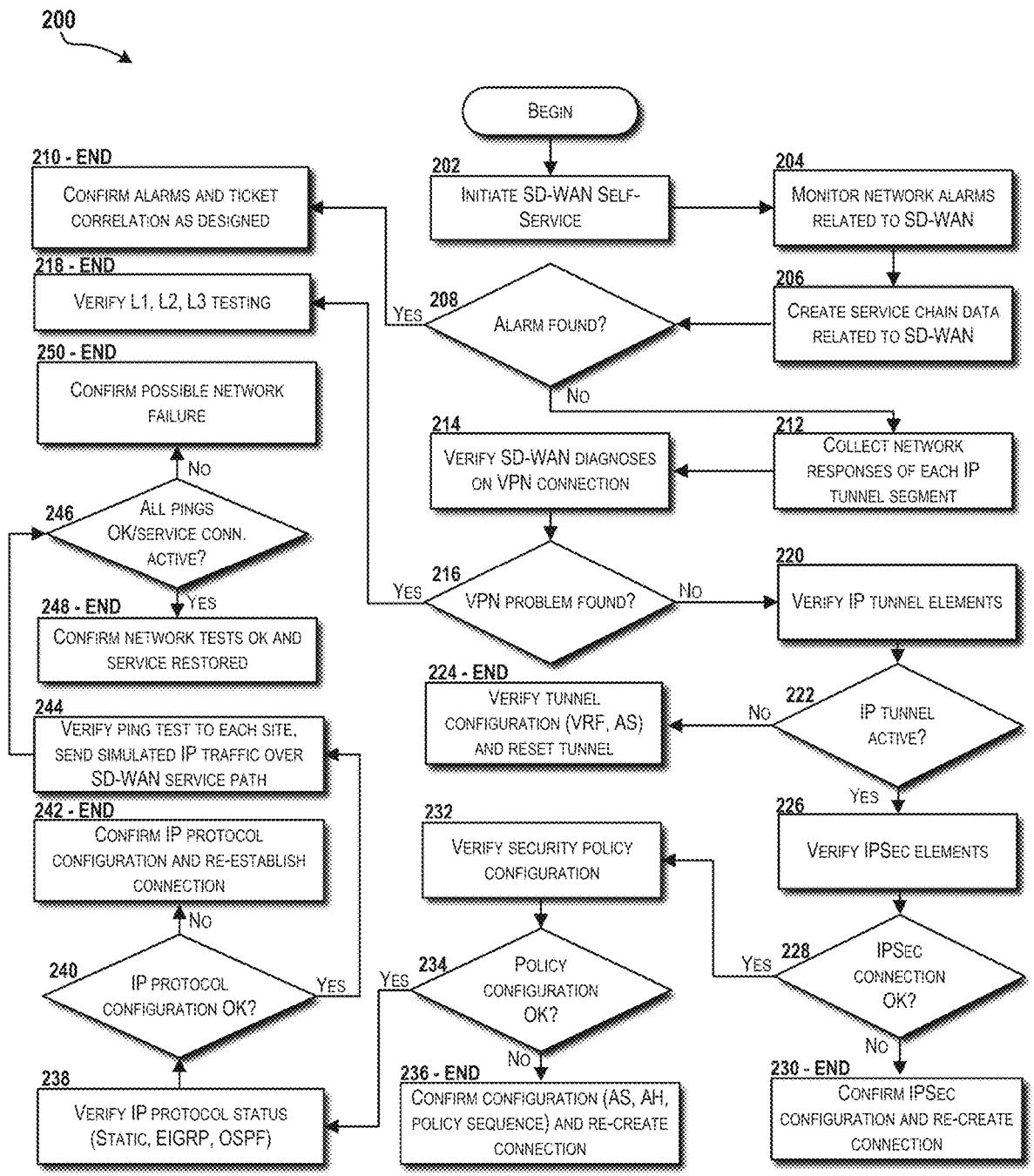
FIG. 2 is a flow diagram illustrating aspects of a method for providing SD-WAN self-service for service assurance, according to an illustrative embodiment of the concepts and technologies disclosed herein.

Turning now to FIG. 2, a flow diagram illustrating aspects of a method 200 for providing SD-WAN self-service for service assurance will be described, according to an illustrative embodiment of the concepts and technologies disclosed herein. It should be understood that the operations of the method disclosed herein is not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the method disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the SD-WAN self-service feature is initiated. The SD-WAN self-service feature can be activated through the self-service portal 130 to address an issue with some aspect of the operation of the SD-WAN 102. For example, a user such as a network engineer, network operator personnel, customer, or other user can use the self-service portal 130 to initiate the SD-WAN self-service feature. Additionally or alternatively, the SD-WAN self-service feature may be initiated in response to a specific event, which may be defined, for example, by a customer or the network operator.

From operation 202, the method 200 proceeds to operation 204. At operation 204, the SD-WAN self-service automation platform 124 monitors network alarms 132 related to the operation of the SD-WAN 102. The network alarms 132 may originate from any of the SD-WAN components 116. From operation 204, the method 200 proceeds to operation 206. At operation 206, the SD-WAN self-service automation platform 124 creates the service chain 134 data related to the SD-WAN 102. From operation 206, the method 200 proceeds to operation 208. At operation 208, the SD-WAN self-service automation platform 124 determines whether any network alarm 132 was found. If so, the method 200 proceeds to operation 210. At operation 210, the SD-WAN self-service automation platform 124 can confirm the network alarm(s) 132 and correlate the network alarm(s) 132 with any support tickets (e.g., generated by the support systems 128). The method 200 can end at operation 210. If, however, at operation 208, the SD-WAN self-service automation platform 124 determines that no network alarm 132 was found, the method 200 proceeds to operation 212.

At operation 212, the SD-WAN self-service automation platform 124 collects network responses from each IP tunnel segment of the SD-WAN 102 (e.g., part of the SD-WAN transport 114 traversing some combination of the SD-WAN components 116). From operation 212, the method proceeds to operation 214. At operation 214, the SD-WAN self-service automation platform 124 verifies SD-WAN diagnoses on any VPN connections (e.g., connections to the MPLS VPN(s) 118). From operation 214, the method 200 proceeds to operation 216. At operation 216, the SD-WAN self-service automation platform 124 determines whether a VPN problem has been found. If so, the method 200 proceeds to operation 218. At operation 218, the SD-WAN self-service automation platform 124 verifies layer 1, layer 2, and layer 3 testing. The method 200 can end at operation 218. If, however, at operation 216, the SD-WAN self-service automation platform 124 determines that no VPN problem has been found, the method 200 proceeds to operation 220.

At operation 220, the SD-WAN self-service automation platform 124 verifies the IP tunnel elements. From operation 220, the method 200 proceeds to operation 222. At operation 222, the SD-WAN self-service automation platform 124 determines whether any IP tunnel is active. If not, the method 200 proceeds to operation 224. At operation 224, the SD-WAN self-service automation platform 124 verifies the tunnel configuration (VRF, AS) and resets the IP tunnel. The method 200 can end at operation 224. If, however, at operation 222, the SD-WAN self-service automation platform 124 determines that an IP tunnel is active, the method 200 proceeds to operation 226.

At operation 226, the SD-WAN self-service automation platform 124 verifies any IPSec elements. From operation 226, the method 200 proceeds to operation 228. At operation 228, the SD-WAN self-service automation platform 124 determines if the IPSec connections are functioning correctly. If not, the method 200 proceeds to operation 230. At operation 230, the SD-WAN self-service automation platform 124 can confirm the IPSec configuration and re-create the IPSec connection. The method 200 can end at operation 230. If, however, at operation 228, the SD-WAN self-service automation platform 124 determines that the IPSec connection is functioning correctly, the method 200 proceeds to operation 232.

At operation 232, the SD-WAN self-service automation platform 124 verifies the security policy configuration. From operation 232, the method 200 proceeds to operation 234. At operation 234, the SD-WAN self-service automation platform 124 determines whether the security policy configuration is functioning correctly. If not, the method 200 proceeds to operation 236. At operation 236, the SD-WAN self-service automation platform 124 confirms the security policy configuration and re-creates the IPSec connection. The method 200 can end at operation 236. If, however, at operation 234, the SD-WAN self-service automation platform 124 determines that the security policy configuration is functioning correctly, the method 200 proceeds to operation 238.

At operation 238, the SD-WAN self-service automation platform 124 verifies the IP protocol status (e.g., static, EIGRP, OSPF). From operation 238, the method 200 proceeds to operation 240. At operation 240, the SD-WAN self-service automation platform 124 determines if the IP protocol configuration is functioning correctly. If not, the method 200 proceeds to operation 242. At operation 242, the SD-WAN self-service automation platform 124 confirms the IP protocol configuration and re-establishes the connection. The method 200 can end at operation 242. If, however, at operation 240, the SD-WAN self-service automation platform 124 determines that the IP protocol configuration is functioning correctly, the method 200 proceeds to operation 244.

At operation 244, the SD-WAN self-service automation platform 124 verifies a ping test to each customer site 104, and sends simulated IP traffic over the SD-WAN service path (e.g., provided, at least in part, by one or more of the SD-WAN transports 114). From operation 244, the method 200 proceeds to operation 246. At operation 246, the SD-WAN self-service automation platform 124 determines if all ping tests are functioning correctly and whether the service connection is active. If so, the method 200 proceeds to operation 248. At operation 248, the SD-WAN self-service automation platform 124 confirms that network tests are functioning correctly and that service has been restored. The method 200 can end at operation 248. If not, the method 200 proceeds to operation 250. At operation 250, the SD-WAN self-service automation platform 124 confirms a possible network failure. The method 200 can end at operation 250.

Figure 3:
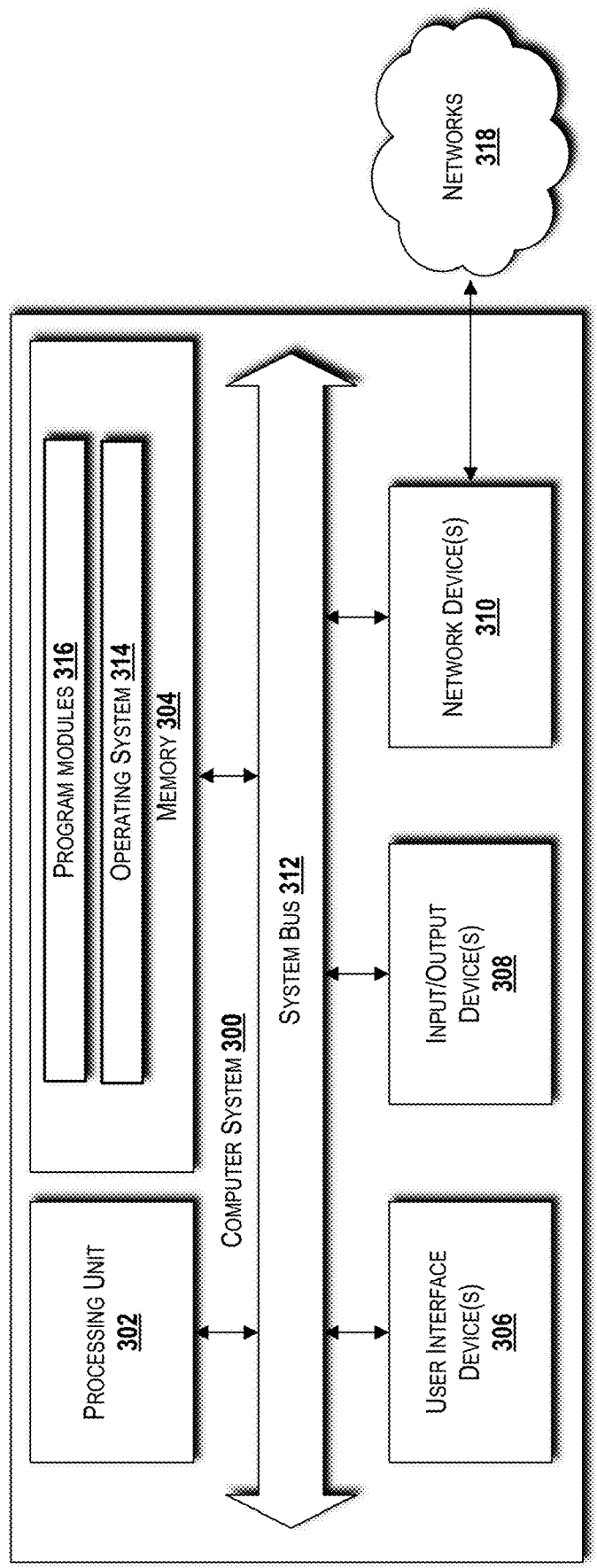
FIG. 3 is a block diagram illustrating an example computer system capable of implementing aspects of the concepts and technologies disclosed herein.

Turning now to FIG. 3, a block diagram illustrating a computer system 300 configured to provide the functionality described herein in accordance with various embodiments. In some embodiments, aspects of the SD-WAN 102, the SD-WAN components 116, the Internet 120, the MPLS VPN(s) 118, the private cloud network(s) 122, the uCPEs 106, the customer networks 112, the support systems 128, the SD-WAN self-service automation platform 124, or some combination thereof can be configured, at least in part, the same as or similar to the computer system 300.

The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 302 can be a single processing unit or a multiple processing unit that includes more than one processing component. Processing units are generally known, and therefore are not described in further detail herein.

The memory 304 communicates with the processing unit 302 via the system bus 312. The memory 304 can include a single memory component or multiple memory components. In some embodiments, the memory 304 is operatively connected to a memory controller (not shown) that enables communication with the processing unit 302 via the system bus 312. The memory 304 includes an operating system 314 and one or more program modules 316. The operating system 314 can include, but is not limited to, members of the WINDOWS family of operating systems from MICROSOFT CORPORATION, the LINUX family of operating systems, the MAC OSX, iOS, and/or other families of operating systems from APPLE CORPORATION, other proprietary and/or non-proprietary operating systems, and the like.

The program modules 316 may include various software and/or program modules described herein. The program modules 316 can include the SD-WAN functions 108, the other functions 110, the rules-based troubleshooting applications 126, the self-service portal 130, or various functionality provided by the SD-WAN self-service automation platform 124. In some embodiments, multiple implementations of the computer system 300 can be used, wherein each implementation is configured to execute one or more of the program modules 316. The program modules 316 and/or other programs can be embodied in computer-readable media containing instructions that, when executed by the processing unit 302, perform the method 200 described herein. According to embodiments, the program modules 316 may be embodied in hardware, software, firmware, or any combination thereof.

By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium," "computer-readable storage medium," and variations thereof does not include waves or signals per se and/or communication media, and therefore should be construed as being directed to "non-transitory" media only.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, a touch-sensitive surface, or an electronic stylus. Further, the I/O devices 308 may include one or more output devices.

The network devices 310 enable the computer system 300 to communicate with one or more networks 318 such as any of the networks described herein. Examples of the network devices 310 include, but are not limited to, a modem, a radio frequency ("RF") or infrared ("IR") or ultraviolet ("UV") transceiver, a telephonic interface, a bridge, a router, or a network card. The network 318 may include a WLAN, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 318 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 4:
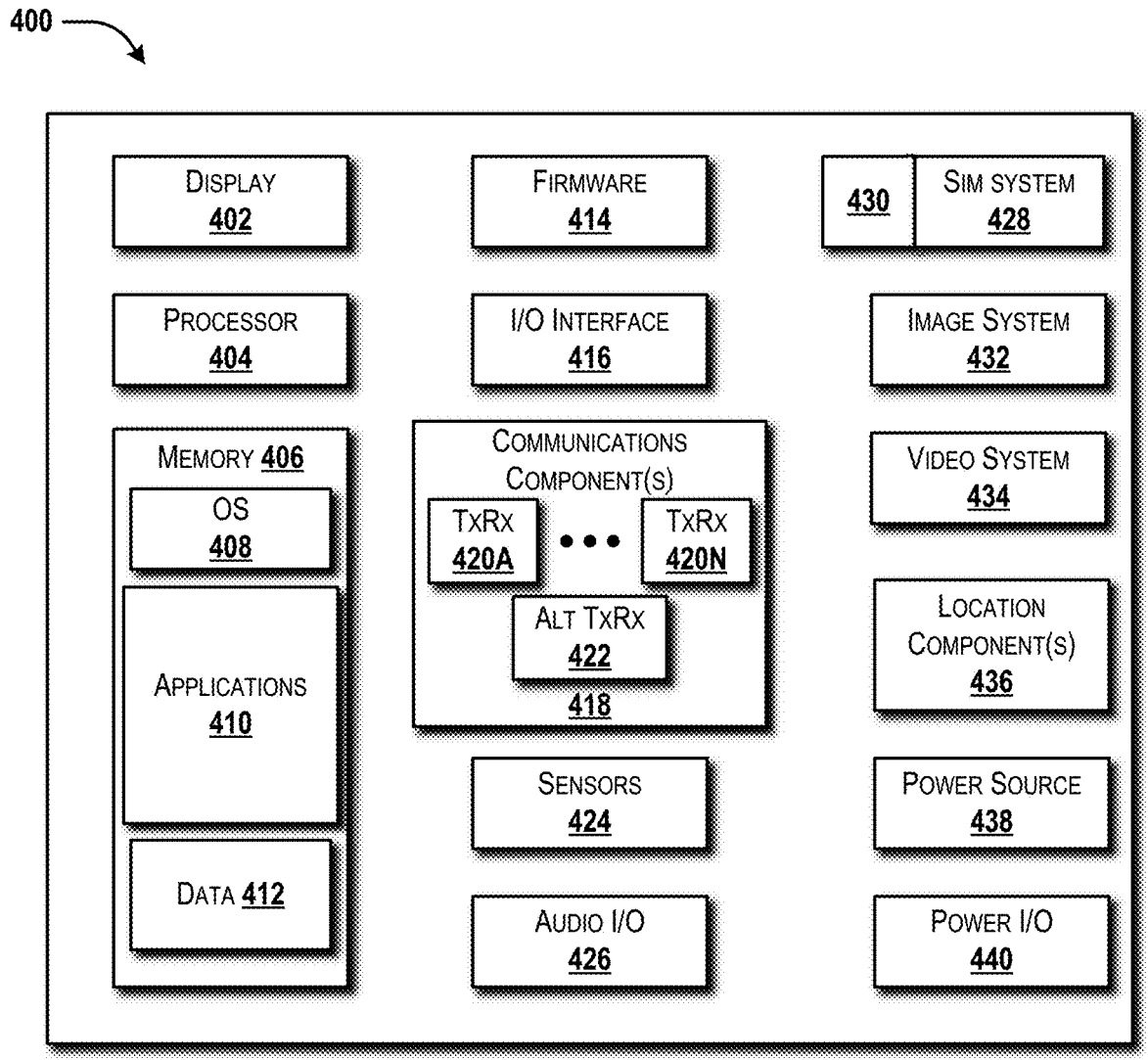
FIG. 4 is a block diagram illustrating an example mobile device capable of implementing aspects of the concepts and technologies disclosed herein.

Turning now to FIG. 4, an illustrative mobile device 400 and components thereof will be described. In some embodiments, the self-service portal 130 can be accessed via the mobile device 400. The mobile device 400 may operate in communication with the customer network(s) 112, the Internet 120, the MPLS VPN(s) 118, the private cloud network(s) 122, or some combination thereof. While connections are not shown between the various components illustrated in FIG. 4, it should be understood that some, none, or all of the components illustrated in FIG. 4 can be configured to interact with one another to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 400 can also include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions stored in the memory 406, or the like. In some embodiments, the applications 410 can also include a UI application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the IOS family of operating systems from APPLE INC., a member of the ANDROID OS family of operating systems from GOOGLE LLC, a member of the TIZEN OS family of operating systems from THE LINUX FOUNDATION, and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in entering/deleting data, entering and setting user IDs and passwords for device access, configuring settings, manipulating content and/or settings, multimode interaction, interacting with other applications 410, and otherwise facilitating user interaction with the operating system 408, the applications 410, and/or other types or instances of data 412 that can be stored at the mobile device 400.

The applications 410, the data 412, and/or portions thereof can be stored in the memory 406 and/or in a firmware 414, and can be executed by the processor 404. The firmware 414 can also store code for execution during device power up and power down operations. It can be appreciated that the firmware 414 can be stored in a volatile or non-volatile data storage device including, but not limited to, the memory 406 and/or a portion thereof.

The mobile device 400 can also include an input/output ("I/O") interface 416. The I/O interface 416 can be configured to support the input/output of data such as location information, presence status information, user IDs, passwords, and application initiation (start-up) requests. In some embodiments, the I/O interface 416 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, wearables, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 can also include a communications component 418. The communications component 418 can be configured to interface with the processor 404 to facilitate wired and/or wireless communications with one or more networks described herein. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments, one or more of the transceivers of the communications component 418 may be configured to communicate using GSM, CDMA CDMAONE, CDMA2000, LTE, and various other 2G, 2.5G, 3G, 4G, 4.5G, 5G, and greater generation technology standards. Moreover, the communications component 418 may facilitate communications over various channel access methods (which may or may not be used by the aforementioned standards) including, but not limited to, TDMA, FDMA, CDMA, W-CDMA, OFDMA, SDMA, and the like.

In addition, the communications component 418 may facilitate data communications using GPRS, EDGE, the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, 5G technologies and standards, and various other current and future wireless data access technologies and standards. In the illustrated embodiment, the communications component 418 can include a first transceiver ("TxRx") 420A that can operate in a first communications mode (e.g., GSM). The communications component 418 can also include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 can also include an alternative transceiver ("Alt TxRx") 422, such as the WLAN component(s) 112, for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 418 can also facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 can also include one or more sensors 424. The sensors 424 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 can also include a subscriber identity module ("SIM") system 428. The SIM system 428 can include a universal SIM ("USIM"), a universal integrated circuit card ("UICC"), embedded SIM ("eSIM"), and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Additionally, or alternatively, an embedded SIM may be used. Because other devices and/or modules for identifying users and/or the mobile device 400 are contemplated, it should be understood that these embodiments are illustrative, and should not be construed as being limiting in any way.

The mobile device 400 can also include an image capture and processing system 432 ("image system"). The image system 432 can be configured to capture or otherwise obtain photos, videos, and/or other visual information. As such, the image system 432 can include cameras, lenses, chargecoupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another device. The video and/or photo content can also be shared with other devices via various types of data transfers via wired and/or wireless communication devices as described herein.

The mobile device 400 can also include one or more location components 436. The location components 436 can be configured to send and/or receive signals to determine a geographic location of the mobile device 400. According to various embodiments, the location components 436 can send and/or receive signals from global positioning system ("GPS") devices, assisted-GPS ("A-GPS") devices, WI-FI/WIMAX and/or cellular network triangulation data, combinations thereof, and the like. The location component 436 can also be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 can also include a power source 438. The power source 438 can include one or more batteries, power supplies, power cells, and/or other power subsystems including alternating current ("AC") and/or direct current ("DC") power devices. The power source 438 can also interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, UV, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 400 or other devices or computers described herein, such as the computer system 300 described above with reference to FIG. 3. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 400 in order to store and execute the software components presented herein. It is also contemplated that the mobile device 400 may not include all of the components shown in FIG. 4, may include other components that are not explicitly shown in FIG. 4, or may utilize an architecture completely different than that shown in FIG. 4.

Figure 5:
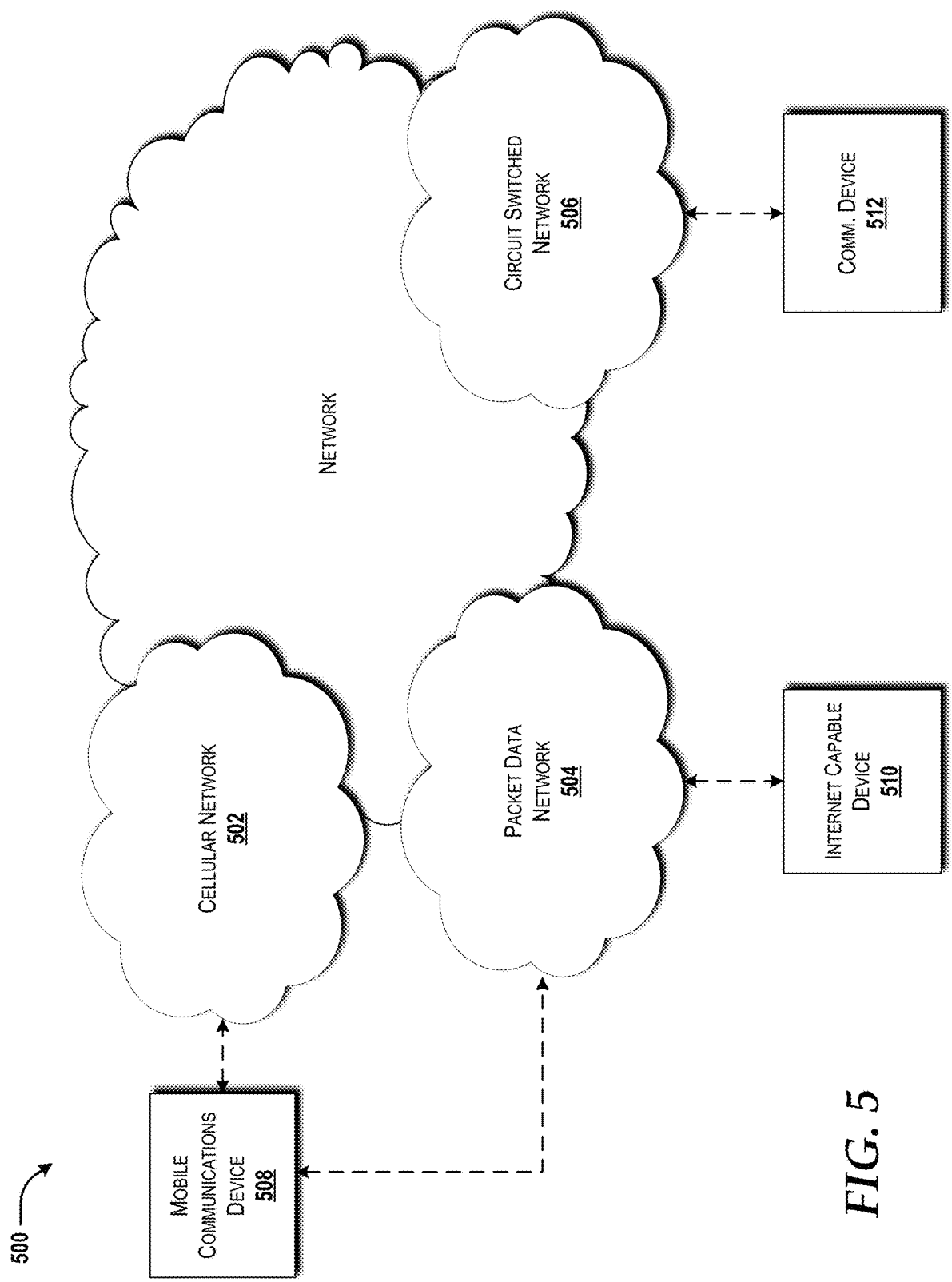
FIG. 5 is a block diagram illustrating an example network capable of implementing aspects of the concepts and technologies disclosed herein.

Turning now to FIG. 5, details of a network 500 are illustrated, according to an illustrative embodiment. The network 500 includes a cellular network 502, a packet data network 504, and a circuit switched network 506 (e.g., a public switched telephone network). The cellular network 502 includes various components such as, but not limited to, base stations, base transceiver stations ("BTSs"), NBs, eNBs, gNBs, base station controllers ("BSCs"), radio network controllers ("RNCs"), mobile switching centers ("MSCs"), MMEs, SGWs, ePDGs, AAA servers, HSSs, PGWs, short message service centers ("SMSCs"), multimedia messaging service centers ("MMSCs"), home location registers ("HLRs"), HSSs, visitor location registers ("VLRs"), charging platforms, billing platforms, voicemail platforms, GPRS core network components, EPC core network components, 5G core network components, future generation core network components, location service nodes, virtualizations thereof, combinations thereof, and/or the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, the mobile device 400, a cellular telephone, a user equipment, a mobile terminal, a PDA, a laptop computer, a handheld computer, and combinations thereof, can be operatively connected to the cellular network 502 and/or the packet data network 504. The mobile communications device 508 can be configured similar to or the same as the mobile device 400 described above with reference to FIG. 4.

The cellular network 502 can be configured as a GSM network and can provide data communications via GPRS and/or EDGE. Additionally, or alternatively, the cellular network 502 can be configured as a 3G UMTS network and can provide data communications via the HSPA protocol family, for example, HSDPA, EUL, and HSPA+. The cellular network 502 also is compatible with mobile communications standards such as LTE, 5G-NR, or the like, as well as evolved and future mobile standards.

The packet data network 504 includes various systems, devices, servers, computers, databases, and other devices in communication with one another, as is generally known. In some embodiments, the packet data network 504 is or includes one or more WI-FI networks, routers, switches, and other WI-FI network components. The packet data network 504 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable systems/devices 510 such as a laptop, a portable device, or another suitable device, can communicate with one or more cellular networks 502, and devices connected thereto, through the packet data network 504. It also should be appreciated that the mobile communications device 508, such as the mobile device 508, can communicate directly with the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510.

Figure 6:
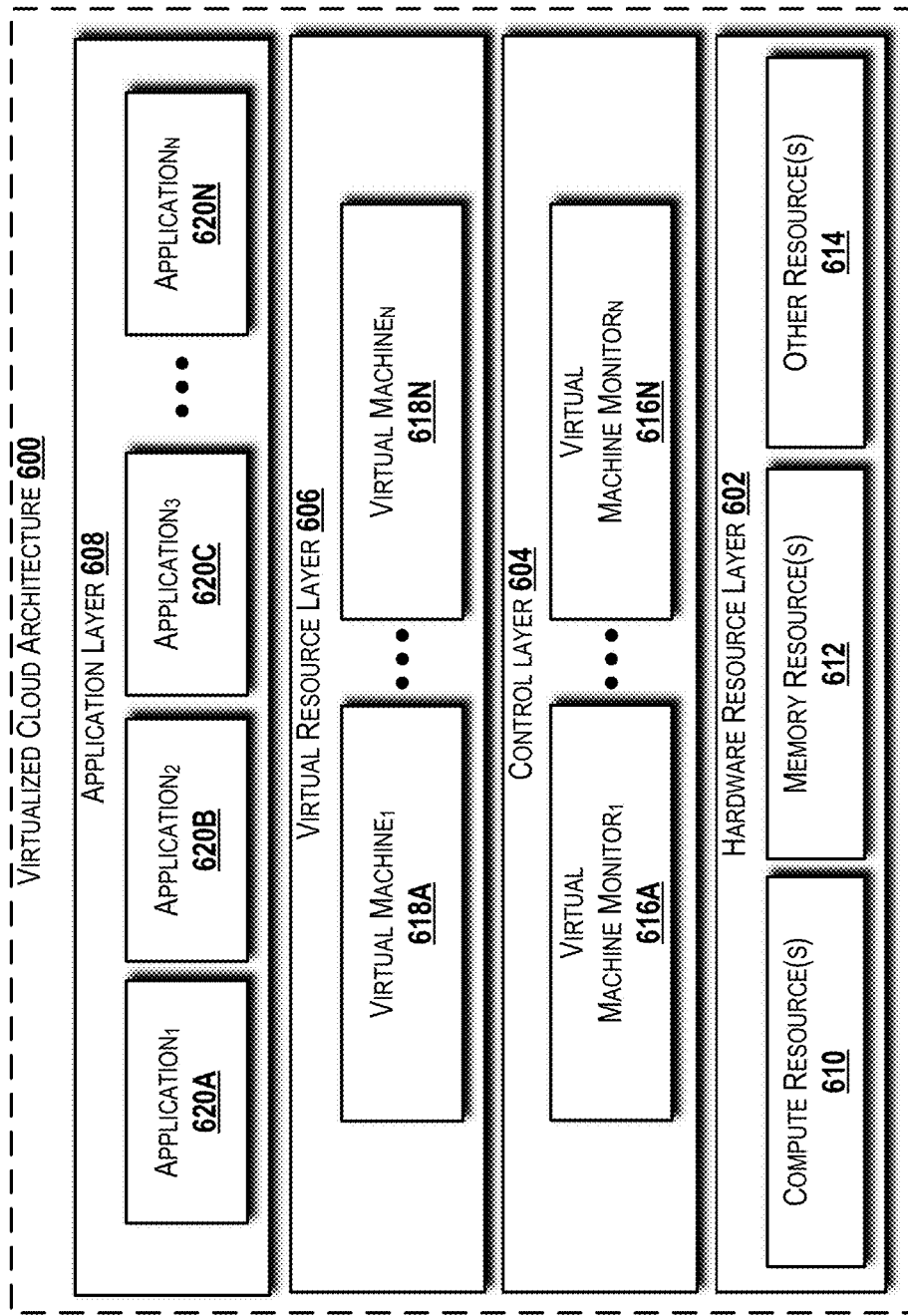
FIG. 6 is a block diagram illustrating a virtualized cloud architecture capable of implementing aspects of the concepts and technologies disclosed herein.

Turning now to FIG. 6, a block diagram illustrating an example virtualized cloud architecture 600 and components thereof will be described, according to an exemplary embodiment. In some embodiments, the virtualized cloud architecture 600 can be utilized to implement, at least in part, the SD-WAN 102, the SD-WAN components 116, the Internet 120, the MPLS VPN(s) 118, the private cloud network(s) 122, the customer network(s) 112, the uCPEs 106, the support systems 128, the self-service portal 130, the SD-WAN self-service automation platform 124, or portions thereof. The virtualized cloud architecture 600 is a shared infrastructure that can support multiple services and network applications. The illustrated virtualized cloud architecture 600 includes a hardware resource layer 602, a control layer 604, a virtual resource layer 606, and an application layer 608 that work together to perform operations as will be described in detail herein.

The hardware resource layer 602 provides hardware resources, which, in the illustrated embodiment, include one or more compute resources 610, one or more memory resources 612, and one or more other resources 614. The compute resource(s) 610 can include one or more hardware components that perform computations to process data, and/or to execute computer-executable instructions of one or more application programs, operating systems, and/or other software. The compute resources 610 can include one or more central processing units ("CPUs") configured with one or more processing cores. The compute resources 610 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 610 can include one or more discrete GPUs. In some other embodiments, the compute resources 610 can include CPU and GPU components that are configured in accordance with a co-processing CPU/GPU computing model, wherein the sequential part of an application executes on the CPU and the computationally-intensive part is accelerated by the GPU. The compute resources 610 can include one or more system-on-chip ("SoC") components along with one or more other components, including, for example, one or more of the memory resources 612, and/or one or more of the other resources 614. In some embodiments, the compute resources 610 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 610 can be or can include one or more hardware components architected in accordance with an advanced reduced instruction set computing ("RISC")

machine ("ARM") architecture, available for license from ARM HOLDINGS. Alternatively, the compute resources 610 can be or can include one or more hardware components architected in accordance with an x86 architecture, such an architecture available from INTEL CORPORATION of Mountain View, California, and others. Those skilled in the art will appreciate the implementation of the compute resources 610 can utilize various computation architectures, and as such, the compute resources 610 should not be construed as being limited to any particular computation architecture or combination of computation architectures, including those explicitly disclosed herein.

The memory resource(s) 612 can include one or more hardware components that perform storage operations, including temporary or permanent storage operations. In some embodiments, the memory resource(s) 612 include volatile and/or non-volatile memory implemented in any method or technology for storage of information such as computer-readable instructions, data structures, program modules, or other data disclosed herein.

Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 610.

The other resource(s) 614 can include any other hardware resources that can be utilized by the compute resources(s) 610 and/or the memory resource(s) 612 to perform operations described herein. The other resource(s) 614 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 602 can be virtualized by one or more virtual machine monitors ("VMMs") 616A-616N (also known as "hypervisors;" hereinafter "VMMs 616") operating within the control layer 604 to manage one or more virtual resources that reside in the virtual resource layer 606. The VMMs 616 can be or can include software, firmware, and/or hardware that alone or in combination with other software, firmware, and/or hardware, manages one or more virtual resources operating within the virtual resource layer 606.

The virtual resources operating within the virtual resource layer 606 can include abstractions of at least a portion of the compute resources 610, the memory resources 612, the other resources 614, or any combination thereof. These abstractions are referred to herein as virtual machines ("VMs"). In the illustrated embodiment, the virtual resource layer 606 includes VMs 618A-618N (hereinafter "VMs 618"). Each of the VMs 618 can execute one or more applications 620A-620N in the application layer 608.

Based on the foregoing, it should be appreciated that aspects of SD-WAN self-service for service assurance have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
monitoring, by a software-defined wide-area network ("SD-WAN") self-service automation platform comprising a processor, an SD-WAN for a network alarm;
creating, by the SD-WAN self-service automation platform, a service chain for the SD-WAN;
determining, by the SD-WAN self-service automation platform, whether a network alarm was found;
in response to determining that a network alarm was found, confirming, by the SD-WAN self-service automation platform, the network alarm and correlating the network alarm with a support ticket;
in response to determining that no network alarms were found, collecting, by the SD-WAN self-service automation platform, a network response from an IP tunnel in the SD-WAN;
verifying, by the SD-WAN self-service automation platform, SD-WAN diagnoses on a virtual private network ("VPN") connection supported by the SD-WAN via the IP tunnel;
determining, by the SD-WAN self-service automation platform, whether a VPN problem was found;
in response to determining that a VPN problem was found, verifying, by the SD-WAN self-service automation platform, layer 1, layer 2, and layer 3 testing of the SD-WAN;
in response to determining that no VPN problems were found, determining, by the SD-WAN self-service automation platform, whether the IP tunnel is active;
in response to determining that the IP tunnel is inactive, verifying, by the SD-WAN self-service automation platform, a configuration of the IP tunnel and resetting the IP tunnel;
in response to determining that the IP tunnel is active, determining, by the SD-WAN self-service automation platform, whether an IPSec connection is active;
in response to determining that the IPSec connection is inactive, confirming, by the SD-WAN self-service automation platform, a configuration of the IPSec connection and recreating the IPSec connection;
in response to determining that the IPSec connection is active, determining, by the SD-WAN self-service automation platform, whether a security policy configuration for the IPSec connection is functioning correctly;
in response to determining that the security policy configuration for the IPSec connection is not functioning correctly, confirming, by the SD-WAN self-service automation platform, the security policy configuration and re-creating the IPSec connection;
in response determining that the security policy configuration for the IPSec connection is functioning correctly, determining, by the SD-WAN self-service automation platform, whether an IP protocol status for the IPSec connection is functioning correctly;

in response to determining that the IP protocol status for the IPSec connection is not functioning correctly, confirming, by the SD-WAN self-service automation platform, an IP protocol configuration and re-establishing the IPSec connection;

in response to determining that the IP protocol status for the IPSec connection is functioning correctly, verifying, by the SD-WAN self-service automation platform, a ping test to a customer site and sending simulated IP traffic over an SD-WAN service path;

determining, by the SD-WAN self-service automation platform, whether the ping test was successful and whether the SD-WAN service path is active;

in response to determining that the ping test was successful and the SD-WAN service path is active, confirming, by the SD-WAN self-service automation platform, that network tests are functioning correctly and service is to be restored; and in response to determining that the ping test was unsuccessful or that the SD-WAN service path is inactive, confirming, by the SD-WAN self-service automation platform, a possible network failure.

2. The method of claim 1, further comprising providing, by the SD-WAN self-service automation platform, a self-service portal through which an SD-WAN self-service feature can be activated.

3. The method of claim 2, wherein the SD-WAN self-service feature is provided to a customer associated with a customer site that utilizes, at least in part, the SD-WAN.

4. The method of claim 1, further comprising analyzing, by the SD-WAN self-service automation platform, a response from an external system via an application programming interface.

5. The method of claim 4, wherein the external system comprises a ticketing system.

6. The method of claim 4, wherein the external system comprises an inventory system.

7. The method of claim 4, wherein the external system comprises a testing system.

8. The method of claim 4, wherein the external system comprises an alarm monitoring system.

9. The method of claim 4, wherein the external system comprises a ticketing notification system.

10. The method of claim 1, further comprising analyzing, by the SD-WAN self-service automation platform, a response associated with layer 1 traffic, layer 2 traffic, or layer 3 traffic.

11. A system comprising:
a processor; and
a computer-readable storage medium comprising instructions that, when executed by the processor, cause the processor to perform operations comprising
monitoring a software-defined wide area network ("SD-WAN") for a network alarm,
creating a service chain for the SD-WAN,
determining whether a network alarm was found,
in response to determining that a network alarm was found, confirming the network alarm and correlating the network alarm with a support ticket,
in response to determining that no network alarms were found, collecting a network response from an IP tunnel in the SD-WAN,
verifying SD-WAN diagnoses on a virtual private network ("VPN") connection supported by the SD-WAN via the IP tunnel,
determining whether a VPN problem was found, in response to determining that a VPN problem was found, verifying layer 1, layer 2, and layer 3 testing of the SD-WAN,
in response to determining that no VPN problems were found, determining whether the IP tunnel is active,
in response to determining that the IP tunnel is inactive, verifying a configuration of the IP tunnel and resetting the IP tunnel,
in response to determining that the IP tunnel is active, determining whether an IPSec connection is active,
in response to determining that the IPSec connection is inactive, confirming a configuration of the IPSec connection and recreating the IPSec connection,
in response to determining that the IPSec connection is active, determining whether a security policy configuration for the IPSec connection is functioning correctly,
in response to determining that the security policy configuration for the IPSec connection is not functioning correctly, confirming the security policy configuration and re-creating the IPSec connection,
in response determining that the security policy configuration for the IPSec connection is functioning correctly, determining whether an IP protocol status for the IPSec connection is functioning correctly,
in response to determining that the IP protocol status for the IPSec connection is not functioning correctly, confirming an IP protocol configuration and re-establishing the IPSec connection,
in response to determining that the IP protocol status for the IPSec connection is functioning correctly, verifying a ping test to a customer site and sending simulated IP traffic over an SD-WAN service path,
determining whether the ping test was successful and whether the SD-WAN service path is active,
in response to determining that the ping test was successful and the SD-WAN service path is active, confirming that network tests are functioning correctly and service is to be restored, and
in response to determining that the ping test was unsuccessful or that the SD-WAN service path is inactive, confirming a possible network failure.

12. The system of claim 11, wherein the operations further comprise providing a self-service portal through which an SD-WAN self-service feature can be activated.

13. The system of claim 12, wherein the SD-WAN self-service feature is provided to a customer associated with a customer site that utilizes, at least in part, the SD-WAN.

14. The system of claim 11, wherein the operations further comprise analyzing a response from an external system via an application programming interface.

15. The system of claim 14, wherein the external system comprises a ticketing system, an inventory system, a testing system, an alarm monitoring system, or a ticketing notification system.

16. A computer-readable storage medium comprising computer-executable instructions that, when executed by a processor of a software-defined wide-area network ("SD-WAN") self-service automation platform, cause the processor to perform operations comprising:
monitoring an SD-WAN for a network alarm;
creating a service chain for the SD-WAN;
determining whether a network alarm was found;
in response to determining that a network alarm was found, confirming the network alarm and correlating the network alarm with a support ticket;

in response to determining that no network alarms were found, collecting a network response from an IP tunnel in the SD-WAN;

verifying SD-WAN diagnoses on a virtual private network ("VPN") connection supported by the SD-WAN via the IP tunnel;

determining whether a VPN problem was found;

in response to determining that a VPN problem was found, verifying layer 1, layer 2, and layer 3 testing of the SD-WAN;

in response to determining that no VPN problems were found, determining whether the IP tunnel is active;

in response to determining that the IP tunnel is inactive, verifying a configuration of the IP tunnel and resetting the IP tunnel;

in response to determining that the IP tunnel is active, determining whether an IPSec connection is active;

in response to determining that the IPSec connection is inactive, confirming a configuration of the IPSec connection and recreating the IPSec connection;

in response to determining that the IPSec connection is active, determining whether a security policy configuration for the IPSec connection is functioning correctly;

in response to determining that the security policy configuration for the IPSec connection is not functioning correctly, confirming the security policy configuration and re-creating the IPSec connection;

in response determining that the security policy configuration for the IPSec connection is functioning correctly, determining whether an IP protocol status for the IPSec connection is functioning correctly;

in response to determining that the IP protocol status for the IPSec connection is not functioning correctly, confirming an IP protocol configuration and re-establishing the IPSec connection;

in response to determining that the IP protocol status for the IPSec connection is functioning correctly, verifying a ping test to a customer site and sending simulated IP traffic over an SD-WAN service path;

determining whether the ping test was successful and whether the SD-WAN service path is active;

in response to determining that the ping test was successful and the SD-WAN service path is active, confirming that network tests are functioning correctly and service is to be restored; and in response to determining that the ping test was unsuccessful or that the SD-WAN service path is inactive, confirming a possible network failure.

17. The computer-readable storage medium of claim 16, wherein the operations further comprise providing a self-service portal through which an SD-WAN self-service feature can be activated.

18. The computer-readable storage medium of claim 17, wherein the SD-WAN self-service feature is provided to a customer associated with a customer site that utilizes, at least in part, the SD-WAN.

19. The computer-readable storage medium of claim 16, wherein the operations further comprise analyzing a response from an external system via an application programming interface.

20. The computer-readable storage medium of claim 19, wherein the external system comprises a ticketing system, an inventory system, a testing system, an alarm monitoring system, or a ticketing notification system.

* * * * *